United States Patent
Maxon

(10) Patent No.: US 7,347,118 B2
(45) Date of Patent: Mar. 25, 2008

(54) PROCESS AND DEVICE FOR PREVENTING THE ENGAGEMENT OF AN IMPERMISSIBLE SPEED IN AN AUTOMATED GEARBOX

(75) Inventor: Andreas Maxon, Karlsruhe (DE)

(73) Assignee: LuK Lamellen und Kupplungsbau Beteiligungs KG, Buehl (DE)

( * ) Notice: Subject to any disclaimer, the term of this patent is extended or adjusted under 35 U.S.C. 154(b) by 260 days.

(21) Appl. No.: 11/162,225

(22) Filed: Sep. 1, 2005

(65) Prior Publication Data
US 2006/0052217 A1 Mar. 9, 2006

(30) Foreign Application Priority Data
Sep. 3, 2004 (DE) .................... 10 2004 042 642

(51) Int. Cl.
*F16H 59/00* (2006.01)
*B60K 21/00* (2006.01)
*G06F 7/00* (2006.01)

(52) U.S. Cl. .................... 74/336 R; 74/473.21; 701/62

(58) Field of Classification Search .................. 74/335, 74/336 R, 473.21–473.28, 471 XY; 477/110, 477/111, 906, 907, 115, 116; 701/62, 64, 701/55, 56; 180/337, 338
See application file for complete search history.

(56) References Cited

U.S. PATENT DOCUMENTS

| | | | | |
|---|---|---|---|---|
| 4,676,115 A * | 6/1987 | Morscheck et al. | ........... | 74/339 |
| 4,945,484 A * | 7/1990 | Cote et al. | .................... | 701/63 |
| 5,078,020 A * | 1/1992 | Hasegawa | ................ | 74/473.22 |
| 5,471,893 A * | 12/1995 | Newbigging | ................. | 74/335 |
| 5,709,140 A * | 1/1998 | Hirose | ......................... | 91/459 |
| 6,269,708 B1 * | 8/2001 | Engenhorst et al. | .......... | 74/335 |
| 6,446,522 B1 * | 9/2002 | Warren et al. | ................ | 74/335 |

FOREIGN PATENT DOCUMENTS

| | | |
|---|---|---|
| DE | 19707141 | 8/1998 |
| DE | 10312401 | 10/2003 |
| DE | 10316442 | 10/2003 |

* cited by examiner

*Primary Examiner*—Roger Pang
(74) *Attorney, Agent, or Firm*—Simpson & Simpson, PLLC

(57) ABSTRACT

A process for preventing the engagement of an impermissible speed in an automated gearbox with a gear-switching member, which can be moved along a gear-selection speed range and out of it into speed step ranges containing the following steps: acquiring the speed step range in which the gear-switching member is moved; acquisition of the momentary vehicle speed; checking as to whether the speed, belonging to the particular speed step range related to the momentary vehicle speed, is permissible; acquisition of the triggering of a gear-switching actuator in case of an impermissible speed; and, triggering of a fault reaction upon the activity of the gear-switching actuator toward the setting of the speed that is recognized as impermissible. A device for implementing the method is also disclosed.

12 Claims, 2 Drawing Sheets

PROCESS AND DEVICE FOR PREVENTING THE ENGAGEMENT OF AN IMPERMISSIBLE SPEED IN AN AUTOMATED GEARBOX

CROSS-REFERENCE TO RELATED APPLICATIONS

This application claims priority of German Patent Application No. 10 2004 042 642.2, filed Sep. 3, 2004, which application is incorporated herein by reference.

FIELD OF THE INVENTION

This invention relates to a process and a device for preventing the engagement of an impermissible speed in an automated gearbox with a gear-switching member that can be moved along a gear-selection speed range and out of it into the speed step ranges.

BACKGROUND OF THE INVENTION

Modern motor vehicles are increasingly equipped with automated gearboxes because they not only improve the driving comfort but because one can also reduce consumption.

DE 103 16 442 A1 discloses a method for recognizing a fault during selection and/or switching of the gear actuator unit of the gear control of an automated gearbox, where a plausibilization of measured and deposited signals is performed. A fault message is issued in case there is no plausibilization of measured and deposited signals. The abovementioned publication furthermore deals with the practical triggering of a switching actuator during the different phases involved in the setting of a speed, especially during synchronization.

DE 103 12 401 A1 describes a gear actuator and a method for performing a referencing of the gear geometry in an automated gear. In this case, at least one learned value of the gear geometry is compared to at least one actual value of the gear geometry, whereby an implausible value is replaced by a predetermined value.

DE 197 07 141 A1 discloses an arrangement for the acquisition of actuation or switching states in a gear actuation device, where a gear-switching member can be moved in one gear-selection speed range and three gear-step speed ranges, which extend perpendicularly away from the gear-selection speed range. A regulating distance of a sensor that acquires the movement of a gear-switching member in a gear-step speed range is subdivided into several sectors that correspond to the phases or functions of the setting of a speed out of the gear-selection speed range or the neutral position.

SUMMARY OF THE INVENTION

The object of the invention is to create a possibility by means of which the setting of a faulty speed can be recognized and prevented in a simple manner, in particular, when the potential setting of an impermissible speed is caused by a fault in the system control of the automated gearbox.

This problem is solved with a process for the prevention of the setting of an impermissible speed in an automated gearbox with a gear-switching member that can be moved along a gear-selection speed range and out of this into the speed step ranges containing the following steps:

acquiring the speed step range in which the gear-switching member is moved, acquisition of the momentary vehicle speed, checking as to whether the speed, belonging to the particular speed step range related to the momentary vehicle speed, is permissible, acquisition of the triggering of a gear-switching actuator in case of an impermissible speed and triggering of a fault reaction upon the activity of the gear-switching actuator toward the setting of the speed that is recognized as impermissible.

In a preferred embodiment of the process, a speed is evaluated as impermissible when it is too small with relation to the momentary vehicle speed.

Advantageously, the gear-switching actuator is deactivated in case of a fault reaction.

As an alternative and/or in addition, a control device of the gear-switching actuator can be reset in case of a fault reaction.

In a preferred embodiment of the invention-based method, the acquisition of the triggering of a gear-switching actuator lasts as long as the gear-switching member is in the speed step range of an impermissible speed.

Here is another solution to the problem involved in the invention: A device is provided for the prevention of the setting of an impermissible speed in an automated gearbox containing a selection actuator for the purpose of moving a gear-switching member along a gear-selection speed range, a gear-switching actuator for moving the gear-switching member along gear-step speed ranges, a sensor device for the acquisition of a vehicle speed and a control device for controlling the selection actuator and the gear-step speed actuator.

With the help of the invention, it is possible to anticipate situations that are critical in terms of the safety of the passengers and the environment that can be caused by the faulty functions of a processor contained in a gear control unit. Such situations that are critical in terms of safety can arise in many different ways.

BRIEF DESCRIPTION OF THE DRAWINGS

The invention will be explained below by way of example and in further detail with reference to the diagrams.

The figures represent the following.

DETAILED DESCRIPTION OF THE INVENTION

Figure 1:
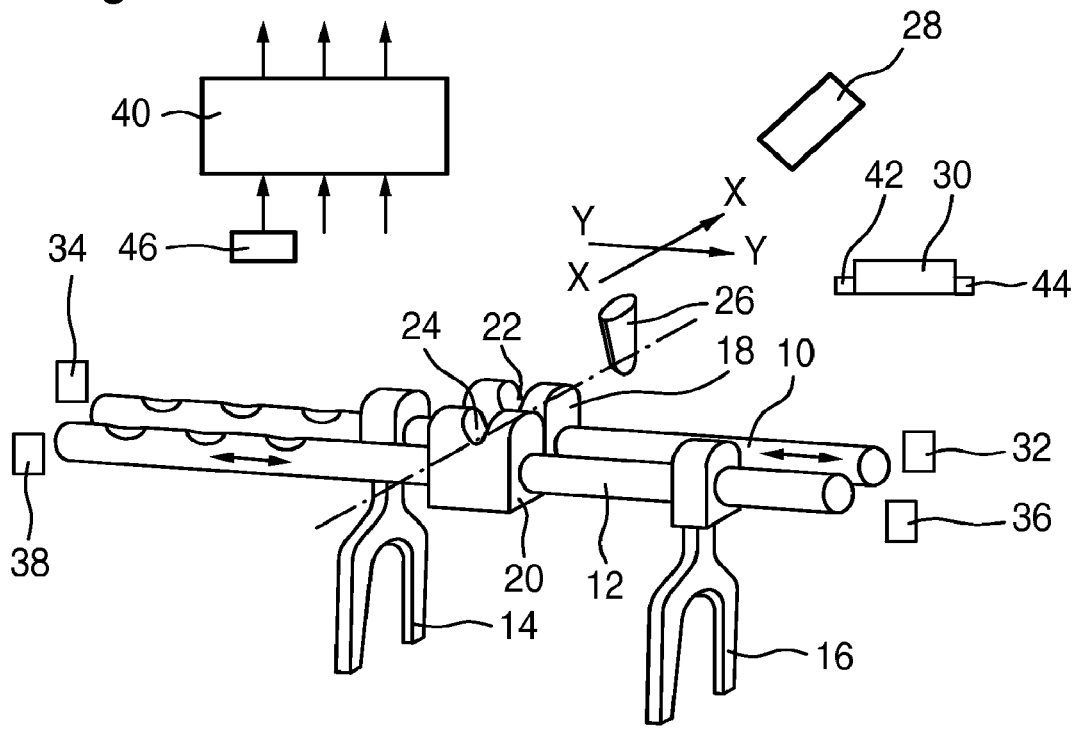
FIG. 1 illustrates parts of a known actuation device for an automated gearbox.
Figure 2:
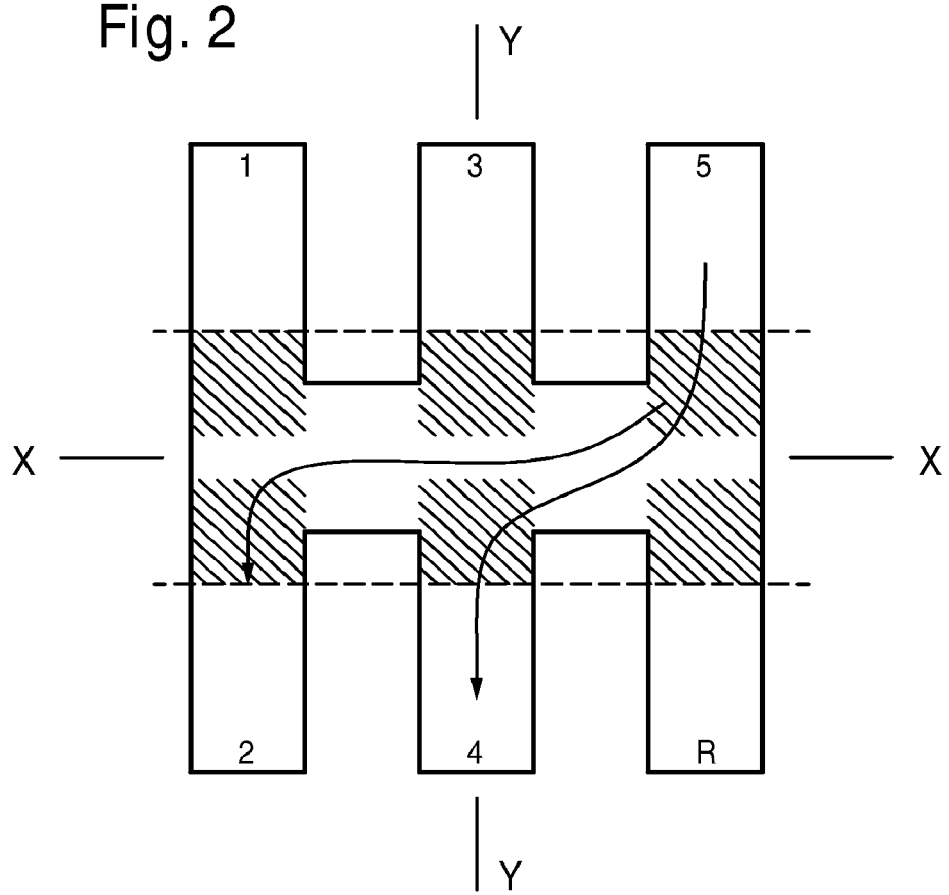
FIG. 2 is a circuit diagram of an automated gearbox.

According to FIG. 1, a known automated gearbox, not shown, includes a device with parts inside the gear and an actuation device outside the gear. The parts inside the gear in the example illustrated contain two mutually parallel, movably arranged sliding selector shafts 10, 12 with one gearshift fork 14, 16 each and a gear-switching block 18, 20 with a recess 22, 24 on the top.

Provided for an engagement in one of the recesses 22, 24 each is a gear-switching finger 26 that can be moved by means of a gear-selection actuator 28 in an X direction laterally with respect to the direction of movability of the sliding selector shafts 10, 12 and that can be moved with a gear-switching actuator 30 parallel to the direction of movability of the sliding selector shafts 10, 12 in a Y direction. Gear-switching finger 26 in the known manner is fixed upon a rod that is attached in a movable and swingable manner on a housing of the gear, which can be shifted with the help of the gear-selection actuator 28 and that can be rotated around its longitudinal axis with the help of the gear-switching actuator 30.

Here is how the gear-switching is done: The gear-switching finger, which after actuation of the gear-selection actuator 28 is in one of the recesses 22, 24 according to the figure, by way of example, is shifted or swung to the left, where the pertinent gear-switching fork shifts a coupling sleeve fastened upon a gear shaft so that a synchronization is brought about, subsequent to which, a new speed can be set. Stops 32, 34, 36 and 38 for the gear-switching device inside the gear are provided to monitor the function of the actuation device and especially for purposes of referencing and these stops limit the movability of the gear-switching forks 14, 16 in one or the other Y direction. Reaching a stop is detected, for example, by the sudden rise of the current consumption of the gear-switching actuator or by the latter's standstill. The detection of a stop can in each case be used for referencing an incremental counter that is connected to the gear-switching actuator. As an alternative, or in addition thereto, one can provide stops 42, 44 directly on the gear-switching actuator 30, and these stops 42, 44 will limit the movability of said actuator and will be used for referencing. Similar stops inside or outside the gear for the movement of the gear-switching finger 26 in the X direction (gear-selection speed range) by means of the gear-selection actuator 28 can be provided.

A control device 40 is used to control actuators 28 and 30 and that control device contains a microprocessor with pertinent memories in which driving programs are stored, corresponding to which—as a function of the operating states of the vehicle—the operation of actuators 28 and 30 is controlled. Control unit 40 advantageously acquires the momentary speed of the vehicle, for example, from a wheel revolution number sensor 46, the engine rpm, the position of a driver pedal, not shown, a selection lever, not shown, for the activation of various control programs as well as normally the position of the gear-switching member 26 in the X and Y directions from which one can draw conclusions as to the particular set speed or the position of the gear actuator unit as a whole.

Let us now assume that, as a consequence of a processor fault, the gear-switching finger 26 is moved into the hachured sector of the gear-step speed range in which synchronization takes place, that is to say, the pertinent gear shaft is brought to the rpm of the speed brink [limit]. When the gear-switching finger is moved out of the gear-selection speed range into the beginning section of gear-step speed range 2, that is to say, into the synchronization sector, then in control unit 40, one examines whether the second speed is a permissible speed at the momentary vehicle speed. If this is not the case, that is to say, if speed 2 is evaluated as being too slow, then the control unit acquires the triggering of the gear-switching actuator 30, for example, by the integration of the voltage that is applied, so that one can determine whether the gear-switching actuator—in spite of the fact that the speed is recognized as impermissible— continues to try to engage the second speed. If this is the case, then after a short time, for example, when the voltage integral exceeds a boundary value, a fault reaction is triggered that leads to a situation where the gear-switching actuator 30 is deactivated and/or it will trigger a reset of the control device 40.

In the example illustrated upon the recognition of a speed as impermissible, one may not wait until the gear-switching finger has been moved by the gear-switching actuator in the direction of the setting of a speed, that is to say, into the synchronization sector of the second speed, because both speeds of the particular gear-step speed range, that is to say, speeds 1 and 2, are impermissible at 120 km/hr. In other words, from the movement of the gear-switching finger along the gear-selection speed range into the position corresponding to the gear-step speed range 1/2, one can draw a conclusion as to the impermissibility of a subsequent speed that is to be engaged and the monitoring of the triggering of the gear-switching actuator can begin.

Figure 3:
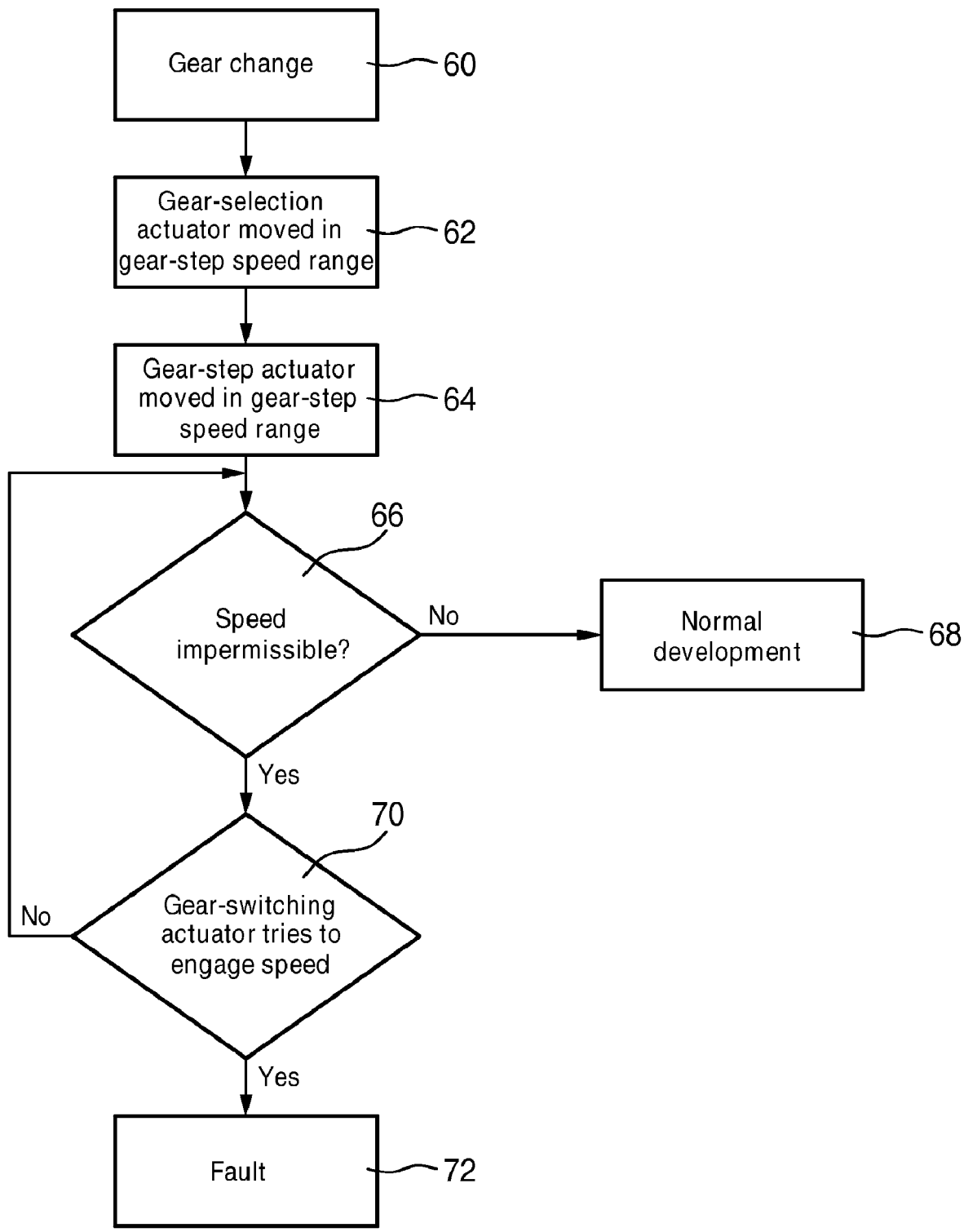
FIG. 3 is a flow chart to explain the invention-based process.

The above process will be explained in greater detail with reference to the flow chart in FIG. 3.

In step 1, the control device on the basis of the present operating parameters decides on a resetting, for example, from speed 5 to speed 4. The occurring actuations of a clutch, not shown, will not be explained below because they are known as such. After the decision to change speed in step 60, gear-switching actuator 30 moves the gear-switching finger 20 into the gear-selection speed range and then, in step 62, the gear-selection actuator 28 moves the gear-switching finger 26 into the target gear-step speed range, which, in the example at hand, should be gear-step speed range 3/4. But gear-step speed range 1/2 is engaged due to a fault in the control device. Then gear-switching actuator 30 is actuated and it moves the gear-switching finger 26 out of the gear-selection speed range into a synchronization sector of the target speed step range (in this case, 4 as such; but in fact, however, 2) (step 64). The moment the gear-switching actuator has moved the gear-switching finger into the speed step range, one can—in step 66 by comparing the started speed step range (position of gear-switching finger 26) with the vehicle speed—determine whether the started speed step range involves an impermissible or a permissible speed. If the speed is impermissible, then in step 68, the further gear-switching action takes place in a normal manner and the speed is engaged.

If it is determined in step 66 that the speed is impermissible (in the example illustrated, at 120 km/hr, the second speed), then in step 70, one checks to see whether the gear-switching actuator 30 keeps trying to engage the speed that is recognized as impermissible. This is possible due to the movability of the gear-switching finger 26 that is delayed by the synchronization procedure, whereby the movement of the gear-switching actuator 30 can be acquired directly or indirectly, for example, by the temporal integration of the applied voltage. If it is determined in step 70 that the gear-switching actuator 30 continues to try to engage the impermissible speed, then in step 72, a fault message is triggered, which leads to a situation where, for example, the gear-switching actuator 30 is deactivated or where the electronic control device is reset in that the latter device starts or newly references a safe initial position.

If it is found in step 70 that the gear-switching actuator no longer tries to engage the impermissible speed, then the system further returns to step 66 so that the monitoring of the gear-switching actuator with regard to the latter's attempt to set the faulty speed will last until it is recognized that the gear-selection actuator 28 moves the gear-switching finger out of the faulty gear-step speed range or the faulty speed step range or where, in a prior step (not shown), the gear-switching actuator 30 moves the gear-switching finger out of the synchronization sector back out into the gear-selection speed range (neutral position) so that one cannot recognize any further impermissible speed that is to be engaged or that the vehicle speed has decreased so much that the hitherto impermissible speed becomes permissible.

The described process or the illustrated strategy of processor monitoring offers the advantage that no required position of the gear-switching finger inside the speed step range need be acquired after the start of synchronization and so that it will work independently of the mode of the attitude regulator (position regulation, power regulation, speed regulation, etc.).

Any impermissible engagement of the reverse speed when the vehicle is running forward can also be intercepted or prevented if the reverse speed is fully synchronized.

The process described is suitable not only for preventing the engagement of an excessively small speed or the faulty engagement of the reverse speed but can also be used to prevent the engagement of an excessively fast speed when this leads to a severely below-speed revolution of the engine that overloads the power train and/or to an excessively small available power output. The process can be used for all types of automated gearboxes, including dual clutch gearboxes or parallel gearboxes.

LIST OF REFERENCE

10 Sliding selector shaft
12 Sliding selector shaft
14 Gearshift fork
16 Gearshift fork
18 Gear-switching block
20 Gear-switching block
22 Recess
24 Recess
26 Gear-switching member
28 Gear-selection actuator
30 Gear-switching actuator
32 Stop
34 Stop
36 Stop
38 Stop
40 Control unit
42 Stop
44 Stop
46 rpm sensor

What is claimed is:

1. A method for preventing engagement of an impermissible speed in an automated gearbox with a gear-switching member that can be moved along a gear-selection speed range and out of said gear-selection speed range into a particular gear-step speed range, selected from a plurality of gear-step speed ranges, comprising the steps of:

(a) acquiring the particular gear-step speed range in which the gear-switching member is moved;
    (b) acquiring a momentary vehicle speed;
    (c) checking whether the particular gear-step speed range is permissible relative to the momentary vehicle speed;
    (d) triggering a gear-switching actuator upon finding the particular gear-step speed range is impermissible; and,
    (e) triggering a fault reaction upon the triggering of the gear-switching actuator toward a setting of the plurality of gear-step speed range that is recognized as impermissible.

2. The method according to claim 1, whereby a particular gear-step speed range is evaluated as impermissible when it is too small relative to the momentary vehicle speed.

3. The method according to claim 1, wherein the gear-switching actuator is deactivated in case of a faulty reaction.

4. The method according to claim 2, wherein the gear-switching actuator is deactivated in case of a faulty reaction.

5. The method according to claim 1, wherein a control device of the gear-switching actuator is reset in case of a fault reaction.

6. The method according to claim 2, wherein a control device of the gear-switching actuator is reset in case of a fault reaction.

7. The method according to claim 1, wherein the triggering of the gear-switching actuator lasts as long as the gear-switching member is in a gear-step speed range of an impermissible speed.

8. The method according to claim 2, wherein the triggering of the gear-switching actuator lasts as long as the gear-switching member is in a gear-step speed range of an impermissible speed.

9. The method according to claim 3, wherein the triggering of the gear-switching actuator lasts as long as the gear-switching member is in a gear-step speed range of an impermissible speed.

10. The method according to claim 4, wherein the triggering of the gear-switching actuator lasts as long as the gear-switching member is in a gear-step speed range of an impermissible speed.

11. The method according to claim 5, wherein the triggering of the gear-switching actuator lasts as long as the gear-switching member is in a gear-step speed range of an impermissible speed.

12. The method according to claim 6, wherein the triggering of the gear-switching actuator lasts as long as the gear-switching member is in a gear-step speed range of an impermissible speed.

* * * * *